United States Patent
Yoon et al.

(10) Patent No.: US 9,145,791 B2
(45) Date of Patent: Sep. 29, 2015

(54) AUTOMATIC INSPECTION APPARATUS FOR GENERATOR TURBINE AND SYSTEM USING THE SAME

(75) Inventors: Byung Sik Yoon, Daejeon (KR); Yong Sik Kim, Daejeon (KR); Hee Jong Lee, Daejeon (KR); Min Woo Nam, Daejeon (KR)

(73) Assignee: Korea Hydro & Nuclear Power Co., Ltd., Seoul (KR)

( * ) Notice: Subject to any disclaimer, the term of this patent is extended or adjusted under 35 U.S.C. 154(b) by 731 days.

(21) Appl. No.: 12/894,091

(22) Filed: Sep. 29, 2010

(65) Prior Publication Data

US 2012/0053864 A1 Mar. 1, 2012

(30) Foreign Application Priority Data

Aug. 30, 2010 (KR) .................. 10-2010-0083840

(51) Int. Cl.
| | |
|---|---|
| *G01N 29/00* | (2006.01) |
| *G01N 29/14* | (2006.01) |
| *G01B 17/00* | (2006.01) |
| *F01D 21/00* | (2006.01) |
| *G01B 21/04* | (2006.01) |

(52) U.S. Cl.
CPC ............ *F01D 21/003* (2013.01); *G01B 21/047* (2013.01); *F05D 2260/80* (2013.01)

(58) Field of Classification Search
CPC .. F01D 21/003; F01D 2260/80; G01B 21/047
USPC ........ 702/56, 83; 73/593, 627, 641, 644, 660, 73/661, 620
See application file for complete search history.

(56) References Cited

U.S. PATENT DOCUMENTS

| | | | | |
|---|---|---|---|---|
| 5,247,743 A | * | 9/1993 | Holloway et al. | ................ 37/355 |
| 5,482,340 A | * | 1/1996 | Jensen et al. | ................ 294/81.51 |

(Continued)

FOREIGN PATENT DOCUMENTS

| | | |
|---|---|---|
| KR | 20-0270825 | 3/2002 |
| KR | 10-2006-0008552 | 1/2006 |
| KR | 2007-0013007 | 1/2007 |

OTHER PUBLICATIONS

R-2000iA ™ Series, FANUC Robotics America, Rochester Hills, MI, ©2005 FANUC Robotics America, Inc., http://www.antenen.com/htdocs/downloads/files/files_dl/Fanuc%20R-2000iA%20Series.pdf.*

*Primary Examiner* — Alexander Satonovsky
(74) *Attorney, Agent, or Firm* — Mintz Levin Cohn Ferris Glovsky and Popeo, P.C.; Kongsik Kim; Carolina E. Säve (57) ABSTRACT

The present disclosure relates to an automatic inspection apparatus for generator turbines and a system using the same. The automatic inspection apparatus adjusts the height of an arm via a lifter, adjusts a rotating angle relative to an inspection object via a rotator, and adjusts forward or backward movement of a probe relative to the inspection object via an expansion/contraction unit while moving the arm having the probe on a rail in accordance with positions of a turbine to be inspected. Furthermore, a compression unit may be used to control contact pressure of the probe to the inspection object at a desired level to allow the probe to closely contact the inspection object, thereby preventing disturbance due to vibration of the probe. In addition, the automatic inspection apparatus has a simple and lightweight configuration so as to be easily installed or removed in a work site.

3 Claims, 12 Drawing Sheets

(56) References Cited

U.S. PATENT DOCUMENTS

| | | |
|---|---|---|
| 7,075,296 B2 | 7/2006 | Moore |
| 7,640,811 B2 * | 1/2010 | Kennedy et al. ................ 73/634 |
| 7,654,144 B2 | 2/2010 | Yoon et al. |
| 2006/0156945 A1 * | 7/2006 | Yamada .......................... 105/31 |
| 2009/0126493 A1 | 5/2009 | Moore et al. |
| 2009/0151458 A1 * | 6/2009 | Yoon et al. ...................... 73/639 |
| 2010/0313772 A1 * | 12/2010 | Liu et al. ....................... 101/123 |

* cited by examiner

AUTOMATIC INSPECTION APPARATUS FOR GENERATOR TURBINE AND SYSTEM USING THE SAME

BACKGROUND OF THE INVENTION

1. Field of the Invention

The present invention relates to an automatic inspection apparatus for generator turbines and, more particularly, to an automatic inspection apparatus for generator turbines and a system using the same, which may eliminate disturbance due to vibration by stabilizing contact pressure of a probe to an inspection object to enhance inspection reliability, and which has a light weight to be easily installed or removed.

2. Description of the Related Art

Figure 1:
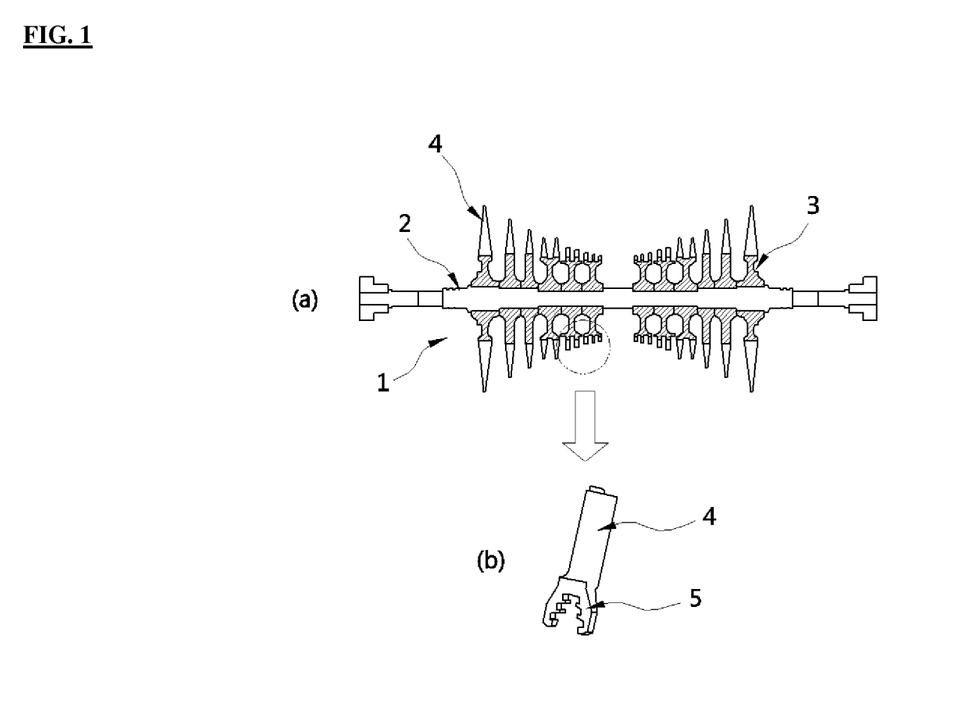
FIG. 1 schematically shows a turbine used in generating facilities, in which (a) shows a longitudinal sectional view and (b) is a perspective view of a root of a blade.

In general, generating facilities have a turbine 1 that drives a generator using high temperature and pressure vapor from a nuclear reactor or boiler to generate electricity, as schematically shown in FIG. 1. The turbine 1 includes a rotor 2, which includes a plurality of discs 3 arranged at predetermined intervals, and blades 4 having different diameters from one another and coupled to the discs 3, respectively. Thus, a vapor having high temperature and high pressure is introduced to collide with and rotate the blades 4, so that the rotor 2 can be rotated to generate electricity through a generator (not shown).

However, since the blades 4 of the turbine 1 are directly exposed to the high temperature and pressure vapor and are subjected to both vibration and centrifugal force, a root 5 at which the blade 4 is fastened to the disc 3 is likely to suffer from cracking. Accordingly, it is necessary to perform periodic inspection of the turbine 1 during operation of the generating facilities or in an inspection term. In particular, it is necessary for the root 5 to be subjected to thorough inspection.

Generally, a nondestructive testing method employing ultrasound waves is employed to inspect the turbine 1. However, the complex structure of the turbine 1 makes it difficult to perform general automatic inspection. Therefore, manual inspection is usually applied to the turbine 1. During manual inspection, a worker evaluates a signal generated when an ultrasound probe is brought into contact with the root 5 of the blade 4. However, the accuracy and reliability of the manual inspection are low because inspection must be performed within a small and narrow space and there are several hundred blades 4 within the turbine 1 to be inspected. Accordingly, a variety of methods and apparatuses for automatic inspection have been developed.

Figure 2:
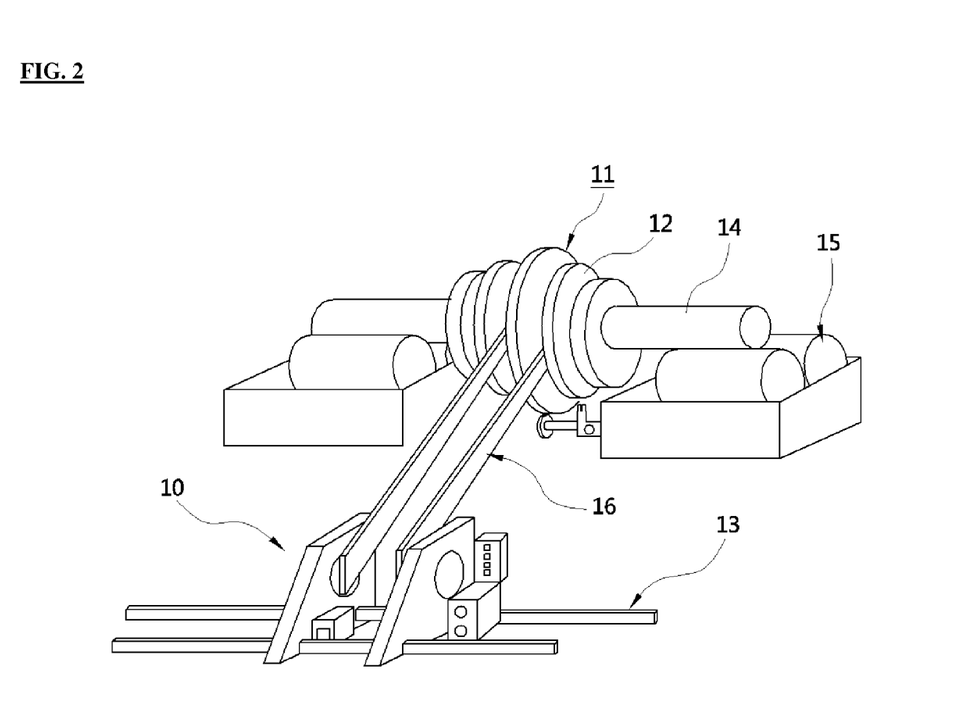
FIG. 2 is a schematic perspective view of a conventional automatic inspection apparatus for inspecting a generator turbine.

One example of the apparatus for automatic inspection includes an inspection apparatus 10 as shown in FIG. 2. The inspection apparatus 10 employs ultrasound waves for inspecting the roots (not shown) of the blades 12 in the turbine 11 and performs inspection while moving along a rail 13 disposed in a longitudinal direction of the turbine 11 or in a state of being attached to a body of the turbine 11.

Specifically, the turbine 11 to be inspected is retracted from a turbine casing (not shown) and both ends of the rotor 14 are seated on a stand 15. On the rail 13, the inspection apparatus 10 moves to a position for inspection. Then, the root is inspected using a probe (not shown) mounted on a leading end of an arm 16 while rotating the turbine 11 360 degrees with respect to the stand 15.

Due to a very small gap between one root and another adjacent root of the circumferentially arranged blades 12, this inspection method causes vibration when the turbine 11 rotates. The vibration may cause insufficient contact between the probe and an inspection object, i.e. the root.

Further, the arm 16 is too long to enhance contact of the probe or to achieve satisfactory contact, thereby making it difficult to obtain accurate ultrasound signals and necessitating additional inspection.

In addition, since the inspection apparatus 10 needs to be relatively heavy in order to stably support the long arm 16, there is a need to improve installation and maintenance of the excessively heavy inspection apparatus 10.

A variety of automatic inspection apparatuses are known in the art. For example, Korean Utility Model No. 20-270825, filed on Mar. 23, 2002, discloses a probe device, entitled "Probe device for Nondestructive Inspection of Blade Root of Steam Turbine in Power Plant." In this device, a holder body supporting a probe is connected to an inspection apparatus magnetically attached to a turbine and the probe is movable upward, downward, forward and backward through the holder body.

Korean Patent Laid-open Publication No. 2006-0008552, filed on Jan. 27, 2006, discloses an inspection apparatus, entitled "Nondestructive Inspection Apparatus for Turbine Blade Root in Power Plant." This apparatus performs inspection by fixing a probe to the blade without retracting the turbine from the casing. That is, the blade is inspected by adjusting the height and rotation of the probe through a plurality of joints.

Korean Patent Laid-open Publication No. 2007-0013007, filed on 30 Jan. 2007, discloses an apparatus and method for inspection, entitled "Apparatus and method using a multi joint robot for automatic ultrasonic inspection of a steam turbine in a power plant." In this apparatus, the multi-joint robot is provided with an ultrasonic sensor at a leading end of an arm, and inspects the front and back of the blade while moving along control traces of a controller. However, the apparatus does not have a traveling function.

U.S. Pat. No. 7,075,296, filed on 11 Jul. 2006, discloses an apparatus, entitled "Inspection carriage for a turbine blade." This inspection carriage inspects the front and back of the blade while using a motor to drive forward and backward movement and rotation of an ultrasound probe, but the apparatus itself is not capable of motion.

U.S. Patent Publication No. 2009/0126493, filed on May 21, 2009, discloses an apparatus, entitled "Nondestructive inspection head for parts having a limited enveloping space." The inspection head is controlled by an independent driver and performs inspection while freely moving and rotating between blades using multiple shafts.

However, reliability and efficiency of the conventional automatic inspection apparatuses are limited due to vibration occurring between a part to be inspected and the probe or it is difficult to maintain constant contact pressure of the probe. Further, the inspection apparatuses are so heavy that installation and removal of such apparatuses require a hoisting device or take too much time and labor.

SUMMARY OF THE INVENTION

The present invention is directed to solving the problems of the related art, and an aspect of the present invention is to provide an automatic inspection apparatus for generator turbines, which may eliminate disturbance due to vibration by applying constant pressure from a probe to an inspection object, thereby improving inspection reliability.

Another aspect of the present invention is to provide an automatic inspection apparatus for generator turbines, which permits easy adjustment of position and angle of a probe relative to an inspection object, thereby enhancing inspection efficiency.

A further aspect of the present invention is to provide an automatic inspection apparatus for generator turbines, which has a simple and lightweight configuration to be easily installed or removed in a work site.

Yet another aspect of the present invention is to provide an automatic inspection system for generator turbines, which can conveniently and efficiently inspect a generator turbine using the automatic inspection apparatus according to embodiments of the invention.

In accordance with one aspect, an automatic inspection apparatus for generator turbines includes a main body provided as a box-shaped frame and accommodating an inspection device; a traveling unit disposed under the main body and driving the main body to travel on a rail; a lifter coupled to the main body to raise or lower an arm having a probe at a leading end thereof; a rotator which inclines the arm at a predetermined angle relative to the lifter; an expansion/contraction unit which moves the arm forward or backward relative to an object to be inspected; and a compression unit disposed at the leading end of the arm and adjusting contact pressure of the probe to the object.

The traveling unit may include a traveling motor mounted on a lower side of the main body and generating a driving force, wheels coupled to the main body and receiving a driving force of the traveling motor to travel on the rail, and a power transmission unit transmitting the driving force from the traveling motor to the wheels.

The power transmission unit may include a drive shaft coupled at opposite ends thereof to the wheels to rotate together with the wheels, and a belt connecting a pulley of the drive shaft to an output shaft of the motor.

The power transmission unit may include one of a chain-sprocket structure and a gear-gear structure.

The power transmission unit may be disposed at one lower side of the main body to drive two wheels.

The lifter may include a bracket rotatably coupled to and supporting the arm relative to the main body, a ball screw vertically extending from and connected to a lower end of the bracket and surrounded with a frame, and a lifting motor having an output shaft to transmit a driving force to the ball screw through a power transmission unit.

The rotator may include an actuator rotatably disposed on a top of the main body and inclining the arm at a desired angle relative to the bracket about a rotating pin, and a bracket rotatably coupling a leading end of a rod of the actuator to the arm via a pin.

The expansion/contraction unit may include an expansion/contraction motor fastened to a supporting member of the arm via a bracket and generating a driving force; a ball screw disposed between both ends of the arm and converting rotation of the expansion/contraction motor into linear motion; and a power transmission unit for transmitting the rotation of the expansion/contraction motor to the ball screw.

The power transmission unit may include a first gear connected to an output shaft of the expansion/contraction unit, and a second gear having a larger diameter than the first gear and coupled to the ball screw via a supporter.

The power transmission unit may include one of a chain-sprocket structure and a belt-pulley structure.

The compression unit may include a supporter rotatably pressing the probe against the object via a first bracket; a second bracket rotatably coupled to the supporter and fixed to the leading end of the arm; a pressure detector coupled to the supporter and detecting the contact pressure of the probe; a pressure controller outputting a control signal by comparing the pressure detected by the pressure detector with a reference value; and a pressure motor pressing the probe via the pressure detector under control of the pressure controller.

The pressure detector may include a sensor rotatably coupled to the supporter and provided therein with a load cell, and a pair of cylinders transmitting the contact pressure of the probe to the sensor.

In accordance with another aspect, an automatic inspection system for generator turbines is provided. The system inspects a turbine retracted from a turbine casing and having a rotor supported at opposite ends thereof on a stand. The system includes: a rail disposed in parallel with the rotor of the turbine in a longitudinal direction of the rotor; the automatic inspection apparatus according to exemplary embodiments disposed to be freely movable on the rail; an ultrasound device which applies ultrasound waves to the probe of the automatic inspection apparatus; and a computer having a certain program to control the ultrasound device and the pressure controller of the automatic inspection apparatus.

The system may further include a display unit which displays the contact pressure of the probe in real time.

BRIEF DESCRIPTION OF THE DRAWINGS

The above and other features of the invention will become apparent from the following description of exemplary embodiments given in conjunction with the accompanying drawings, in which.

DETAILED DESCRIPTION OF THE INVENTION

Exemplary embodiments of the present invention will hereinafter be described with reference to accompanying drawings.

Figure 3:
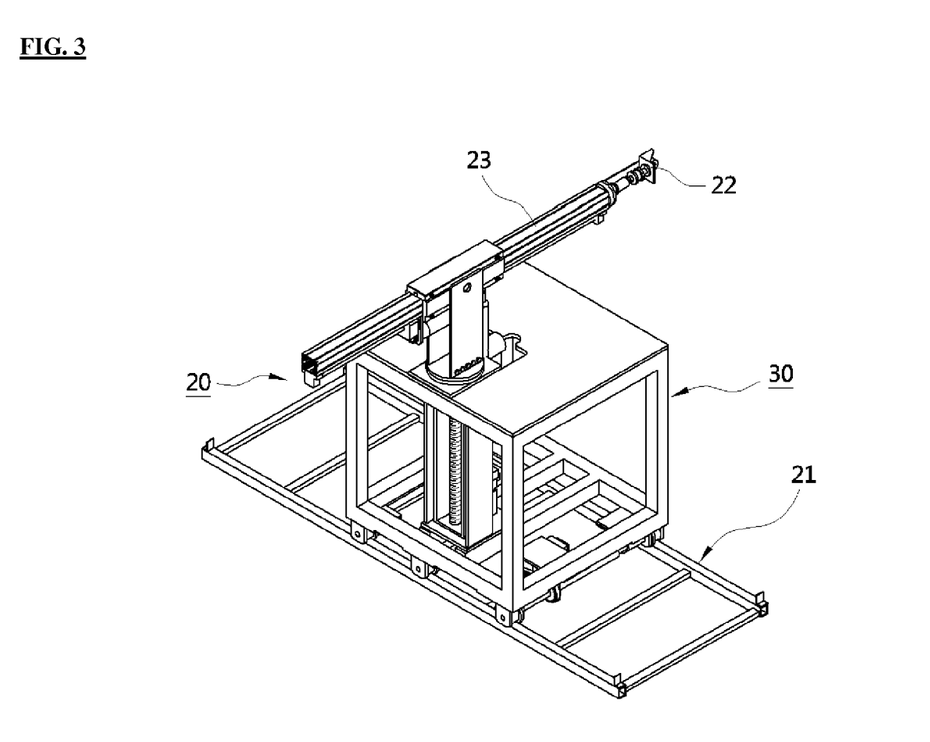
FIG. 3 is a schematic perspective view of an automatic inspection apparatus for generator turbines according to an exemplary embodiment, which is disposed on a rail and movable thereon.

FIG. 3 is a schematic perspective view of an automatic inspection apparatus for generator turbines according to an exemplary embodiment, which is disposed on a rail and movable thereon.

Referring to FIGS. 3 to 6, the automatic inspection apparatus 20 for generator turbines according to the embodiment includes a main body 30 provided as a box-shaped frame and accommodating an inspection device; a traveling unit 40 disposed under the main body 30 and driving the main body 30 to travel on a rail 21; a lifter 50 coupled to the main body 40 to raise or lower an arm 23 having a probe 22 at a leading end thereof; a rotator 60 inclining the arm 23 at a predetermined angle relative to the lifter 50; an expansion/contraction unit 70 moving the arm 23 forward or backward relative to an object to be inspected; and a compression unit 80 disposed at the leading end of the arm 23 and adjusting contact pressure of the probe 22 to the object.

As shown in FIGS. 3 to 6, the main body 30 is a box-shaped frame with a rectangular cross-section and may be opened or closed. The inspection device is mounted on the main body 30, which is driven by the traveling unit 40 to move forward or backward on the rail 21, so that roots for blades of a generator turbine can be subjected to first to seventh ultrasonic inspection stages by the inspection device moving on the rail.

Referring to FIGS. 3 to 6, the traveling unit 40 includes a traveling motor 41 mounted on a lower side of the main body 30 and generating a driving force; wheels 42 respectively coupled to four corners of the main body 30 and receiving the driving force from the traveling motor 41 to travel on the rail 21; and a power transmission unit 43 transmitting the driving force from the traveling motor 41 to the wheels 42.

Figure 4:
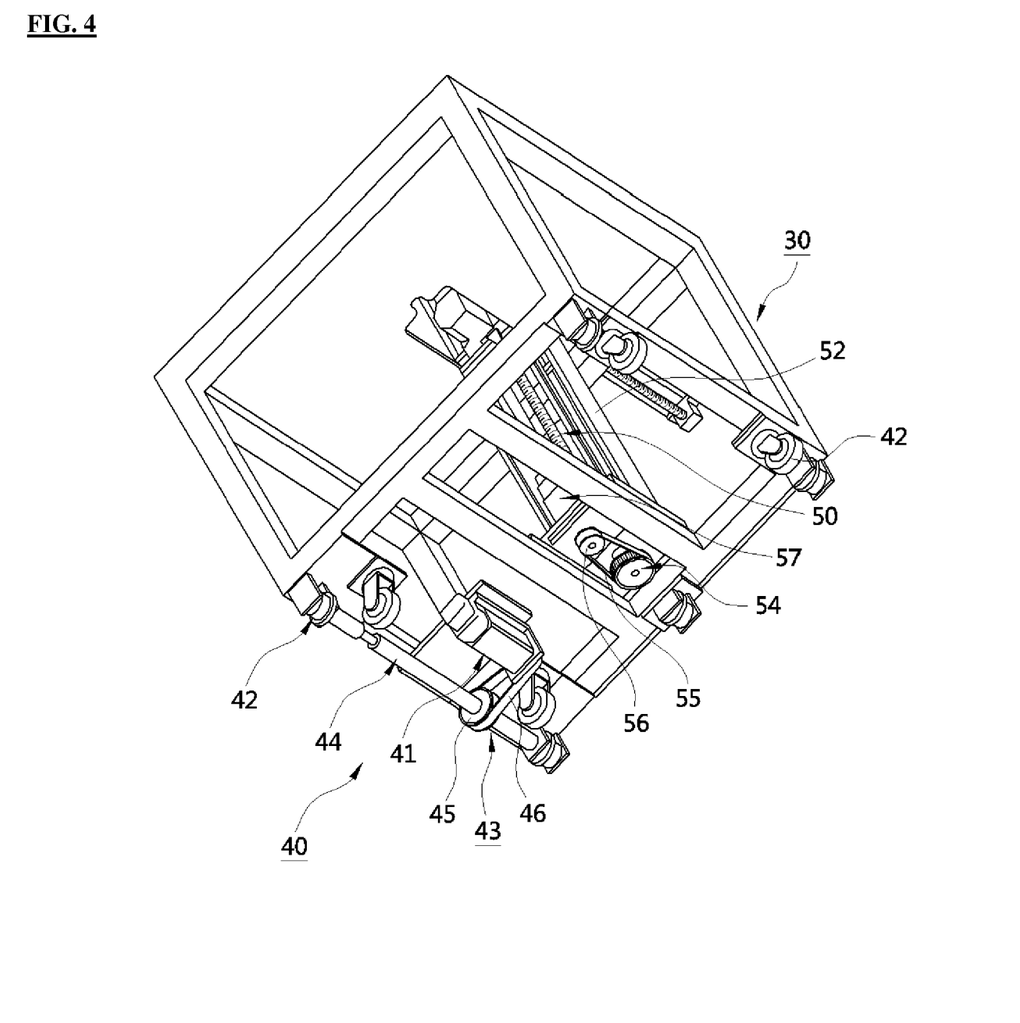
FIG. 4 is a bottom view of a main body of the automatic inspection apparatus according to the exemplary embodiment of the present invention.

The power transmission unit 43 is generally disposed at one side of the main body to drive two wheels 42. For example, the power transmission unit 43 includes a drive shaft 44 coupled at opposite ends thereof to the two wheels 42 to rotate together with the two wheels 42, and a belt 46 connecting a pulley 45 of the drive shaft 44 to an output shaft (not shown) of the motor 41. Alternatively, the power transmission unit 43 may have other structures such as a chain-sprocket structure, a gear-gear structure, etc.

Figure 5:
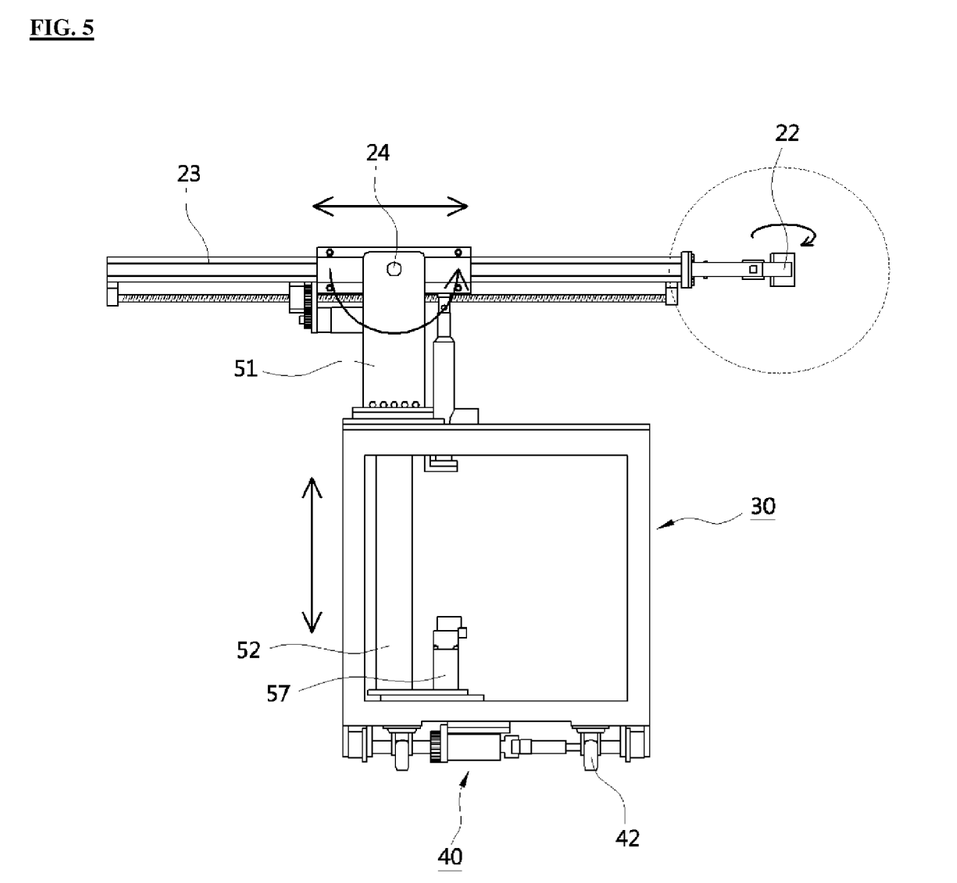
FIG. 5 is a schematic side view showing operation of the automatic inspection apparatus according to the exemplary embodiment of the present invention.
Figure 6:
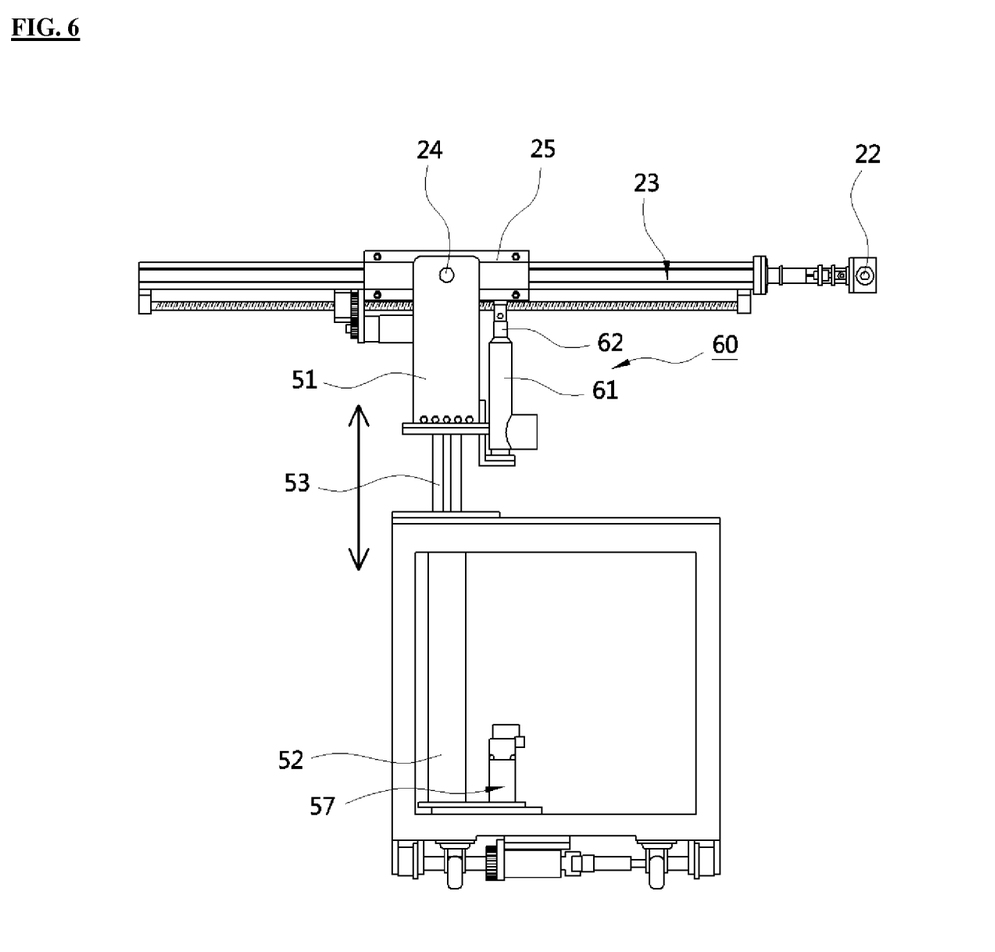
FIG. 6 is a schematic side view of the automatic inspection apparatus according to the exemplary embodiment of the present invention, in which a lifter is operated to lift an arm to a raised position.

Referring to FIGS. 4 to 6, the lifter 50 may raise or lower the arm 23 having the probe 22 at the leading end thereof to be perpendicular to the main body 30. The lifter 50 includes a bracket 51 rotatably coupled to and supporting the arm 23, a ball screw 53 vertically extending from and connected to a lower end of the bracket 51 and surrounded with a frame 52, and a lifting motor 57 having an output shaft 56 to transmit driving force to the ball screw 53 through a power transmission unit, such as a pulley 54, a belt 55, etc.

Upon receiving a control signal from a controller described below, the lifting motor 57 is driven to rotate the belt 55 and pulley 54 through the output shaft 56, and the ball screw 53 rotates to move the bracket 51 upward. Thus, the height of the probe 22 may be adjusted by raising the arm 23 in the bracket 51.

On the contrary, when the controller controls the lifting motor 57 to rotate in the reverse direction, the bracket 51 is lowered by the ball screw 53, thereby lowering the arm 23 and the probe 22.

Figure 7:
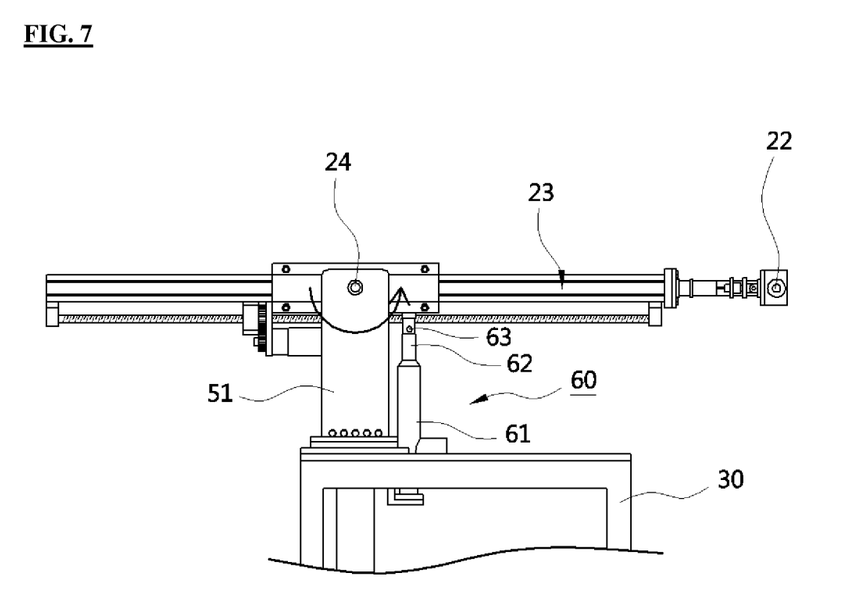
FIG. 7 is a schematic side view of the automatic inspection apparatus according to the exemplary embodiment of the present invention, in which the arm is maintained at a horizontal position.
Figure 8:
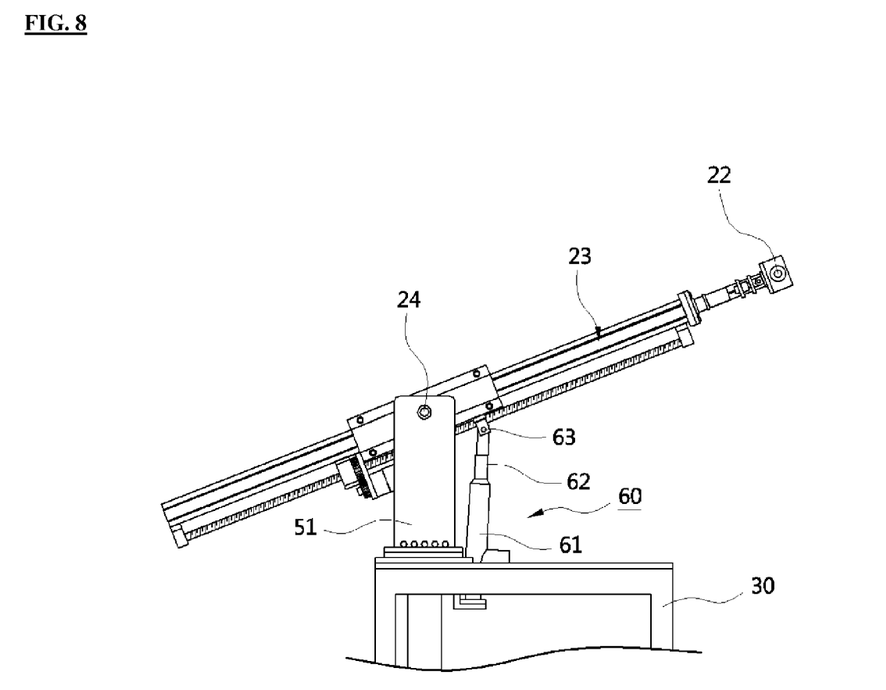
FIG. 8 is a schematic side view of the automatic inspection apparatus according to the exemplary embodiment of the present invention, in which a rotator is operated to incline the arm.

The rotator 60 inclines the arm 23 at a predetermined angle relative to the bracket 51 of the lifter 50. Referring to FIGS. 6 to 8, the rotator 60 includes an actuator 61 rotatably disposed on a top of the main body 30 and inclining the arm 23 at a desired angle relative to the bracket 51 about a rotating pin 24, and a bracket 64 rotatably coupling a leading end of a rod 62 of the actuator 61 to the arm 23 via a pin 63.

Thus, if fluid such as oil, compressed air, etc. is introduced into a cylinder (not shown) of the actuator 61 under control of the controller, the rod 62 of the actuator 61 is expanded. Then, as shown in FIG. 8, the arm 23 slidably supported on a supporting member 25 is raised while being rotated about the rotating pin 24 in the counterclockwise direction via the pin 63 and the bracket 64, and the probe 22 is also raised to increase the rotation angle.

On the contrary, to decrease the height and the rotation angle of the probe 22, the fluid is supplied to the actuator 61 in the reverse direction under the control of the controller, the rod 62 of the actuator 61 is contracted. Then, the arm 23 is lowered while being rotated about the rotating pin 24 in the clockwise direction, and the probe 22 is also lowered to thereby decrease the rotation angle. Consequently, the amount and direction of fluid introduced into the actuator 61 are adjusted by the controller, thereby adjusting an expanded distance of the rod 62, i.e. the rotation angle of the arm 23 and probe 22.

Figure 9:
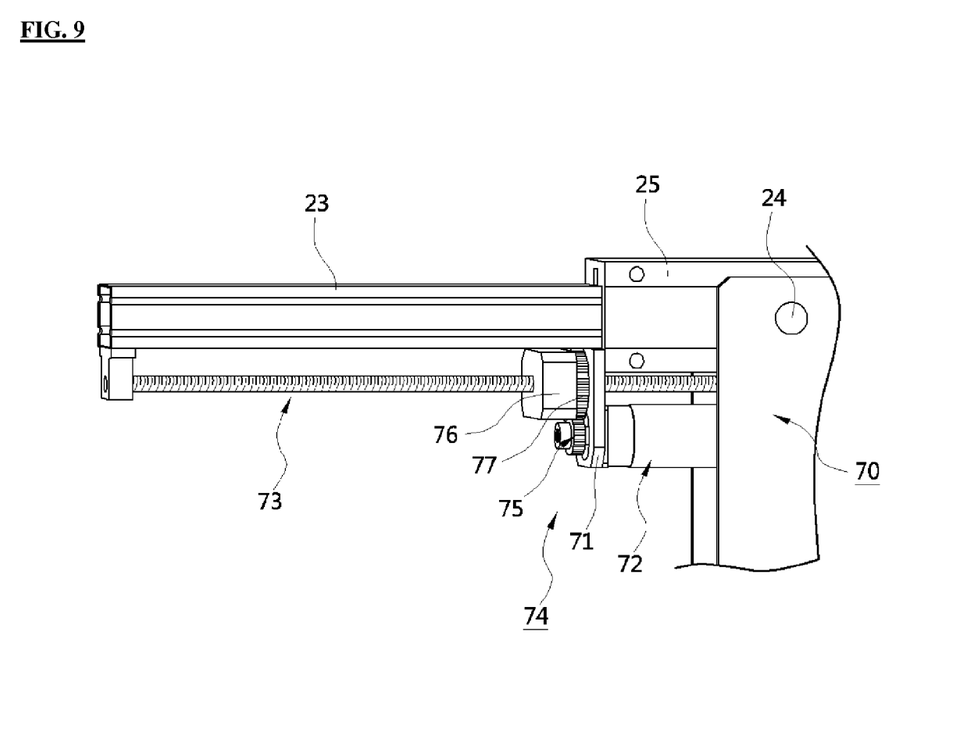
FIG. 9 is an enlarged perspective view of an expansion/contraction unit of the automatic inspection apparatus according to the exemplary embodiment of the present invention, which moves the arm forward or backward.

The expansion/contraction unit 70 allows the arm 23 and the probe 22 to move toward or away from an object to be inspected, e.g., the turbine. In FIG. 9, the expansion/contraction unit 70 includes an expansion/contraction motor 72 fastened to the supporting member 25 of the arm 23 via a bracket 71 and generating a driving force; a ball screw 73 disposed between both ends of the arm 23 and converting rotation of the expansion/contraction motor 72 into linear motion; and a power transmission unit 74 for transmitting the rotation of the expansion/contraction motor 72 to the ball screw 73.

The power transmission unit 74 includes a first gear 75 connected to an output shaft (not shown) of the expansion/contraction unit 72, and a second gear 77 having a larger diameter than the first gear 75 and coupled to the ball screw 73 via a supporter 76. Alternatively, the power transmission unit 74 may have other structures such as a chain-sprocket structure, a belt-pulley structure, etc.

When the expansion/contraction motor 72 is driven according to a control signal of the controller, the first and second gears 75 and 77 of the power transmission unit 74 are rotated and this rotation is transmitted to the ball screw 73 through the supporter 76. Then, the ball screw 73 rotates and converts the rotation into a linear motion to push or pull the leading end of the arm 23, so that the arm 23 moves forward or backward while passing through and sliding the supporting member 25 in the state that the arm 23 is supported by the supporting member 25. As a result, the probe 22 disposed at the leading end of the arm 23 may move toward or away from the object through the ball screw 73 as the expansion/contraction motor 72 operates.

Figure 10:
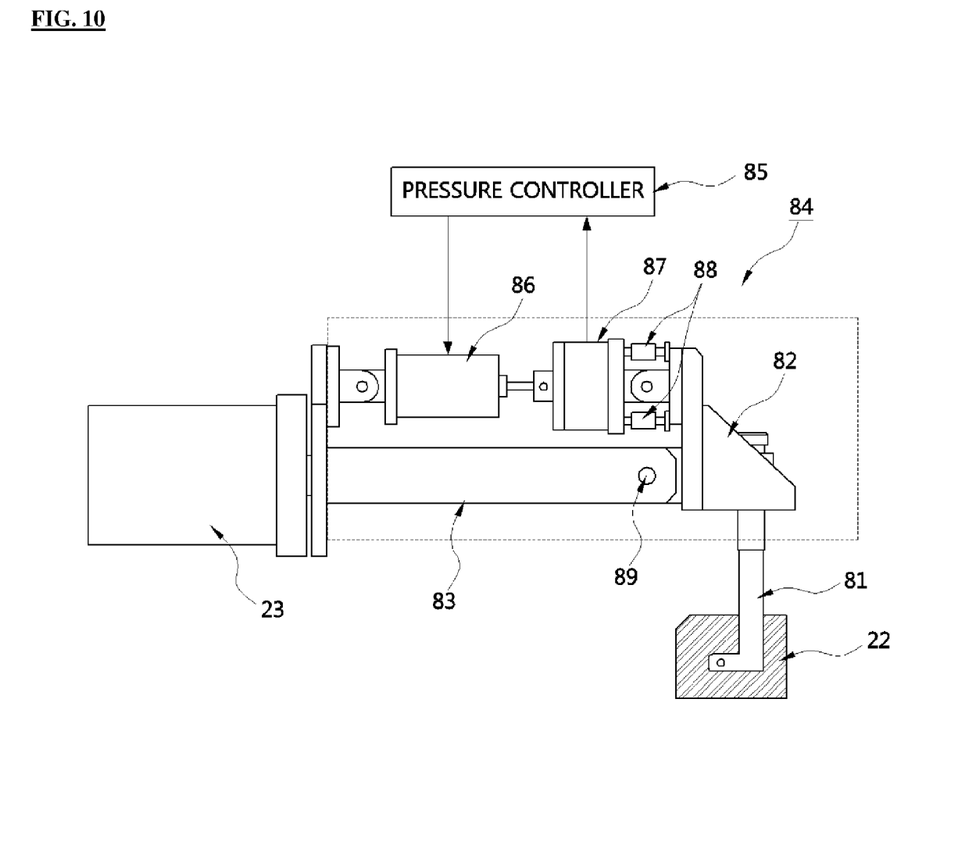
FIG. 10 is a schematic view of a compression unit of the automatic inspection apparatus according to the exemplary embodiment of the present invention, which adjusts contact pressure between an object to be inspected and a probe.

The compression unit 80 forces the probe 22 at the leading end of the arm 23 to be brought into close contact with an inspection object with predetermined contact pressure. As shown in FIG. 10, the compression unit 80 includes a supporter 82 rotatably pressing the probe 22 against an inspection object via a first bracket 81; a second bracket rotatably coupled to the supporter 82 and fixed to the leading end of the arm 23; a pressure detector 84 coupled to the supporter 82 and detecting the contact pressure of the probe 22; a pressure controller 85 outputting a control signal by comparing the pressure detected by the pressure detector 84 with a reference value; and a pressure motor 86 pressing the probe 22 via the pressure detector 84 under control of the pressure controller 85.

The pressure detector 84 includes a sensor 87 rotatably coupled to the supporter 82 and provided therein with a load cell, and a pair of cylinders 88 transmitting the contact pressure of the probe 22 to the sensor 87.

Thus, when the probe 22 contacts the inspection object and generates pressure, this pressure causes the supporter 82 to rotate about a pin 89 and is transmitted to the pair of cylinders 88. Then, the sensor 87 detects expansion and contraction of the cylinder 88, and the pressure sensed by the load cell is converted into a control signal, which in turn is output to the pressure controller 85. Accordingly, the pressure controller 85 compares the input pressure with a preset reference value. If the input pressure is larger or smaller than the reference value, the control signal is output to the pressure motor 86 to allow the pressure motor 86 to operate to compress the sensor 87 and the supporter 82. Then, the supporter 82 rotates about the pin 89 in the clockwise or counterclockwise direction on the second bracket 83, and increases or decreases the contact pressure of the probe 22 to the inspection object through the first bracket 81. That is, the compression unit 80 repeats the foregoing operation until the contact pressure of the probe 22 to the inspection object reaches a predetermined desired value through the pressure controller 85.

Figure 11:
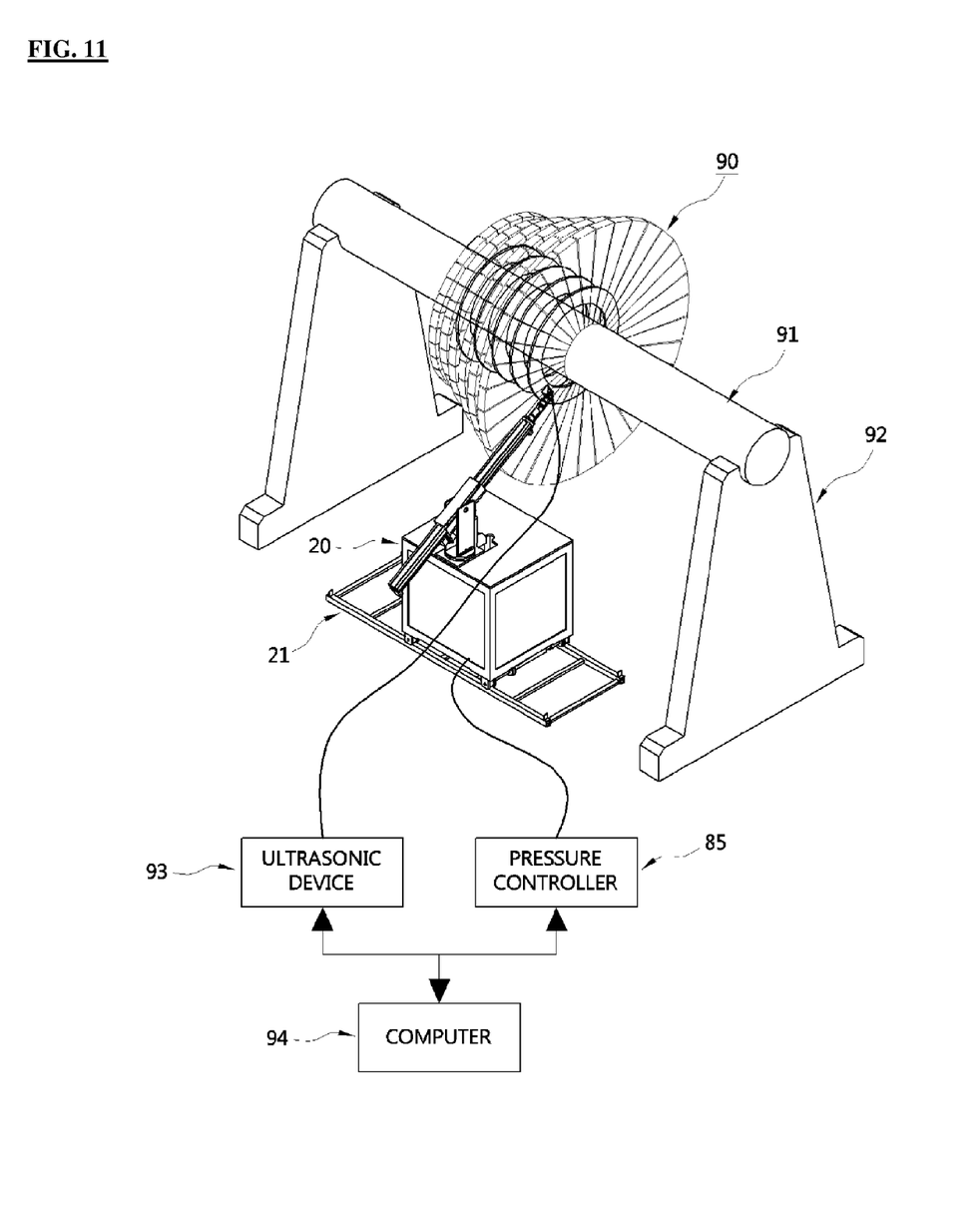
FIG. 11 is a schematic view of a system for inspecting a turbine using an automatic inspection apparatus for generator turbines according to an exemplary embodiment of the present invention.

FIG. 11 is a schematic view of a system for inspecting a turbine using the automatic inspection apparatus 20 for generator turbines according to an exemplary embodiment of the present invention.

A turbine 90 to be inspected is retracted from a turbine casing (not shown) and a rotor 91 of the turbine 90 is supported at opposite ends thereof on a stand 92. The rail 21 is disposed in parallel to the rotor 91 of the turbine 90 in a longitudinal direction of the rotor 90. On the rail 21, the automatic inspection apparatus 20 according to the exemplary embodiment is disposed to be freely movable in the longitudinal direction of the turbine 90. Thus, the inspection apparatus 20 inspects the turbine 90 through the probe 22 disposed at the leading end of the arm 23 while the turbine 90 supported on the stand 92 is rotated 360 degrees.

Further, as shown in FIG. 11, the automatic inspection apparatus 20 is connected to an ultrasound device 93 which applies ultrasound waves to the probe 22. Further, the system is provided with a computer 24 which has a predetermined program for controlling the ultrasound device 93 and the pressure controller 85. Further, a display unit (not shown) may be provided to display the pressure of the probe 22 to be controlled in real time in order to inform a user of the pressure of the probe 22.

Figure 12:
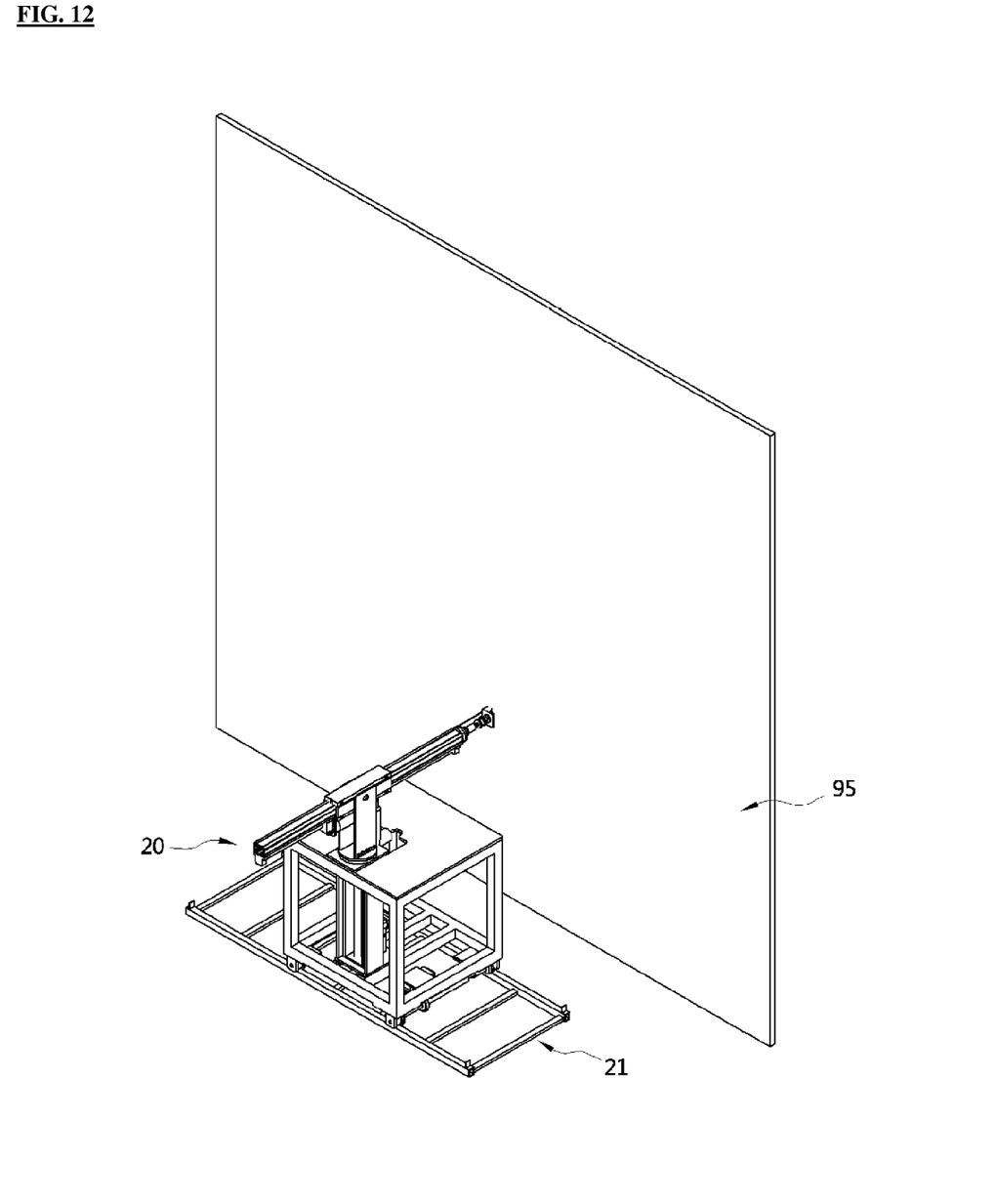
FIG. 12 is a schematic view showing use of the automatic inspection apparatus according to the exemplary embodiment in inspecting a welded part.

FIG. 12 is a schematic view showing use of the automatic inspection apparatus 20 according to the exemplary embodiment in inspecting a welded part. This shows that the automatic inspection apparatus 20 according to the exemplary embodiment may be used in inspecting a defect of the welded part in a small and narrow space or on a flat wall that is difficult to manually inspect. Further, the apparatus according to the exemplary embodiment may be applied not only to ultrasonic inspection for the roots of the blade in the turbine 90 as described above, but also to various inspects for a disc of the turbine, a disc keyway, etc.

As such, the automatic inspection apparatus 20 for generator turbines according to exemplary embodiments adjusts the height of the arm 23 via the lifter 50, adjusts a rotating angle of the probe 22 relative to an inspection object via the rotator 60, and adjusts forward or backward movement of the probe 22 relative to the inspection object via the expansion/contraction unit 70 while moving the arm 23 having the probe 22 on the rail 21 in accordance with positions of the generator turbine to be inspected. Furthermore, the compression unit 80 may be used to control contact pressure of the probe 22 to the inspection object at a desired level so as to allow the probe 22 to closely contact the inspection object, thereby preventing disturbance due to vibration of the probe 22. In addition, the automatic inspection apparatus 20 has a simple and lightweight configuration to be easily installed or removed in a work site.

The automatic inspection apparatus for generator turbines according to exemplary embodiments adjusts the height of the arm via the lifter, adjusts a rotating angle relative to an inspection object via the rotator, and adjusts forward or backward movement of the probe relative to the inspection object via the expansion/contraction unit while moving the arm having the probe on the rail in accordance with positions of a generator turbine to be inspected. Furthermore, the compression unit may be used to control contact pressure of the probe to the inspection object at a desired level to allow the probe to closely contact the inspection object, thereby preventing disturbance due to vibration of the probe. In addition, the automatic inspection apparatus has a simple and lightweight configuration to be easily installed or removed in a work site without additional instrumentation, such as a crane, for transportation and installation.

Although some embodiments have been provided to illustrate the present invention, it will be apparent to those skilled in the art that the embodiments are given by way of illustration, and that various modifications, changes, and alternations can be made without departing from the spirit and scope of the invention. The scope of the invention should be limited only by the accompanying claims and equivalents thereof.

What is claimed is:

1. An automatic inspection apparatus for generator turbines, comprising:
    a main body provided as a box-shaped frame and accommodating an inspection device;
    a traveling unit disposed under the main body and driving the main body to travel on a rail;
    a lifter coupled to the main body to raise or lower an arm having a probe at a leading end thereof;
    a rotator inclining the arm at a predetermined angle relative to the lifter;
    an expansion/contraction unit moving the arm forward or backward relative to an object to be inspected; and
    a compression unit disposed at the leading end of the arm and adjusting contact pressure of the probe to the object,
    wherein the traveling unit comprising a traveling motor mounted on a lower side of the main body and generating a driving force, wheels coupled to the main body and receiving a driving force of the traveling motor to travel on the rail, and a power transmission unit transmitting the driving force from the traveling motor to the wheels,
    wherein the power transmission unit comprises a drive shaft coupled at opposite ends thereof to the wheels to rotate together with the wheels, and a belt connecting a pulley of the drive shaft to an output shaft of the motor,
    wherein the power transmission unit is disposed at one lower side of the main body to drive two wheels,
    wherein the lifter comprises a bracket rotatably coupled to and supporting the arm relative to the main body, a ball screw vertically extending from and connected to a lower end of the bracket and surrounded with a frame, and a lifting motor having an output shaft to transmit a driving force to the ball screw through a power transmission unit, where the rotator comprises an actuator disposed on a top of the main body and inclining the arm at a desired angle relative to the bracket about a rotating pin, and a bracket rotatably coupling a leading end of a rod of the actuator to the arm via a pin, wherein the expansion/contraction unit comprises an expansion/contraction motor fastened to a supporting member of the arm via a bracket and generating a driving force, a ball screw disposed between both ends of the arm and converting rotation of the expansion/contraction motor into linear motion, and a power transmission unit for transmitting the rotation of the expansion/contraction motor to the ball screw, wherein the power transmission unit comprises a first gear connected to an output shaft of the expansion/contraction unit, and a second gear having a larger diameter than the first gear and coupled to the ball screw via a supporter, wherein the compression unit comprises a supporter rotatably pressing the probe against the object via a first bracket, a second bracket rotatably coupled to the supporter and fixed to the leading end of the arm, a pressure detector coupled to the supporter and detecting the contact pressure of the probe, and a pressure motor pressing the probe via the pressure detector under the control of the pressure controller, wherein a pressure controller in communication with the compression unit outputs a control signal by comparing the pressure detected by the pressure detector with a reference value, and wherein the pressure detector comprises a sensor rotatably coupled to the supporter and provided therein with a load cell, and a pair of cylinders transmitting the contact pressure of the probe to the sensor.

2. An automatic inspection system for generator turbines for inspecting a turbine which is retracted from a turbine casing and includes a rotor supported at opposite ends thereof on a stand, the system comprising:
   a rail disposed in parallel to the rotor of the turbine in a longitudinal direction of the rotor;
   the automatic inspection apparatus of claim 1;
   an ultrasound device which applies ultrasound waves to the probe of the automatic inspection apparatus; and
   a computer having a certain program to control the ultrasound device and the pressure controller of the automatic inspection apparatus.

3. The system according to claim 2, further comprising: a display unit which displays the contact pressure of the probe in real time.

\* \* \* \* \*